(12) United States Patent
Heckel et al.

(10) Patent No.: US 9,524,468 B2
(45) Date of Patent: *Dec. 20, 2016

(54) METHOD AND SYSTEM FOR IDENTIFYING DEPENDENT COMPONENTS

(71) Applicant: INTERNATIONAL BUSINESS MACHINES CORPORATION, Armonk, NY (US)

(72) Inventors: Reinhard Wolfram Heckel, Rueschlikon (CH); Vasileios Vasileiadis, Waedenswil (CH); Michail Vlachos, Rueschlikon (CH)

(73) Assignee: INTERNATIONAL BUSINESS MACHINES CORPORATION, Armonk, NY (US)

(\*) Notice: Subject to any disclaimer, the term of this patent is extended or adjusted under 35 U.S.C. 154(b) by 42 days.

This patent is subject to a terminal disclaimer.

(21) Appl. No.: 14/935,476

(22) Filed: Nov. 9, 2015

(65) Prior Publication Data
US 2016/0063392 A1    Mar. 3, 2016

(51) Int. Cl.
*G06N 5/02* (2006.01)
*G06N 7/00* (2006.01)

(52) U.S. Cl.
CPC .............. *G06N 7/005* (2013.01); *G06N 5/022* (2013.01)

(58) Field of Classification Search
None
See application file for complete search history.

(56) References Cited

U.S. PATENT DOCUMENTS

| | | | |
|---|---|---|---|
| 7,840,986 B2 * | 11/2010 | Ali et al. ................. | 725/105 |
| 8,775,231 B1 | 7/2014 | Nipko et al. | |
| 9,110,955 B1 * | 8/2015 | Bernhardsson | |
| 2006/0062363 A1 * | 3/2006 | Albrett ................... | 379/101.01 |
| 2007/0121674 A1 * | 5/2007 | Chen et al. ............. | 370/468 |
| 2010/0114665 A1 | 5/2010 | Stengard et al. | |

(Continued)

OTHER PUBLICATIONS

List of IBM Patents or Patent Applications treated as Related—Date Filed: Feb. 29, 2016; 2 pages.

(Continued)

*Primary Examiner* — Paulinho E Smith
(74) *Attorney, Agent, or Firm* — Cantor Colburn LLP; Daniel Morris

(57) ABSTRACT

Embodiments include processing a data structure representing a dependency matrix having columns representing respective first components and rows representing respective second components. Aspects include assigning each cell of the matrix a value indicative of the level of dependency or indicative of an unknown dependency of a pair of first and second components forming the cell and assigning each component of the first and second components an affiliation vector indicative of the strength of affiliation of the component to N predefined initial clusters of cells of the matrix. Aspects also include determining a probability model using the affiliations vectors parameters and estimating the parameters of the probability model for a plurality of different numbers of clusters starting from the initial number N of clusters. Aspects further include computing a score for the parameters of the probability model estimated and selecting the parameters of the probability model with the highest computed score.

7 Claims, 4 Drawing Sheets

(56) References Cited

U.S. PATENT DOCUMENTS

| | | | |
|---|---|---|---|
| 2010/0169328 A1* | 7/2010 | Hangartner | 707/751 |
| 2011/0097001 A1* | 4/2011 | Labbi et al. | 382/225 |
| 2011/0184977 A1* | 7/2011 | Du et al. | 707/769 |
| 2011/0246537 A1* | 10/2011 | Labbi et al. | 707/805 |
| 2012/0278091 A1 | 11/2012 | Yaseen et al. | |
| 2013/0031063 A1* | 1/2013 | Freris et al. | 707/693 |
| 2014/0081996 A1* | 3/2014 | Bertram et al. | 707/751 |
| 2014/0146077 A1* | 5/2014 | Labbi et al. | 345/619 |
| 2014/0279727 A1* | 9/2014 | Baraniuk et al. | 706/11 |
| 2015/0046406 A1* | 2/2015 | Freris et al. | 707/690 |
| 2015/0187024 A1* | 7/2015 | Karatzoglou et al. | 705/13 |

OTHER PUBLICATIONS

U.S. Appl. No. 14/967,678, filed Dec. 14, 2015; Entitled: "Method and System for Identifying Dependent Components".

* cited by examiner

|       | 0 | 1   | 2   | 3   | 4   | 5   | 6   | 7   | 8   | 9   | 10 | 11 |
|-------|---|-----|-----|-----|-----|-----|-----|-----|-----|-----|----|----|
| 0     | 0 | 0   | 0   | .9  | .89 | .9  | .7  | 0   | 0   | 0   | 0  | 0  |
| 1     | 0 | 0   | 0   | .77 | .77 | .77 | .54 | 0   | 0   | 0   | 0  | 0  |
| 2     | 0 | 0   | 0   | .9  | .89 | .9  | .7  | 0   | 0   | 0   | 0  | 0  |
| 3     | 0 | 0   | 0   | 0   | 0   | 0   | 0   | 0   | 0   | 0   | 0  | 0  |
| 4     | 0 | .9  | .9  | .9  | .7  | 0   | 0   | 0   | 0   | 0   | 0  | 0  |
| 5     | 0 | .9  | .9  | .9  | .7  | 0   | 0   | 0   | 0   | 0   | 0  | 0  |
| 6     | 0 | .77 | .77 | .77 | .83 | .83 | .83 | .83 | .83 | .83 | 0  | 0  |
| 7     | 0 | 0   | 0   | 0   | .76 | .92 | .92 | .92 | .92 | .92 | 0  | 0  |
| 8     | 0 | 0   | 0   | 0   | .76 | .92 | .92 | .92 | .92 | .92 | 0  | 0  |
| 9     | 0 | 0   | 0   | 0   | .76 | .92 | .92 | .92 | .92 | .92 | 0  | 0  |
| 10    | 0 | 0   | 0   | 0   | 0   | 0   | 0   | 0   | 0   | 0   | 0  | 0  |
| 11    | 0 | 0   | 0   | 0   | 0   | 0   | 0   | 0   | 0   | 0   | 0  | 0  |

Item 4 is relevant to User 6 with confidence 0.83 because:

A. User 6 has access to Items 1-3. Users with similar access history (e.g., Users 4-5) also accessed Item 4.

B. Moreover, User 6 has access to Items 5-9. Users with similar access history (e.g., Users 7-9) also accessed Item 4.

Fig. 3

METHOD AND SYSTEM FOR IDENTIFYING DEPENDENT COMPONENTS

BACKGROUND

The present invention relates to the field of digital computer systems, and more specifically, to a method for processing a data structure to identify dependent components.

Graphs are a popular data representation for modeling dependencies, relationships, connections, etc., between entities or components. For example, bi-partite graphs have been the focus of a broad spectrum of studies spanning from document analysis to bioinformatics. A bi-partite graph paradigm may indeed be relied upon to represent various kinds of relationships, e.g., between parts of a computer-aided designed or CAD complex objects, real-world objects and attributes, etc., or even to represent data acquisition patterns between sets of processor cores and sets of data. Analysis of such related data is therefore of great importance for many systems, which accumulate increasingly large amounts of interaction data.

SUMMARY

Various embodiments provide a method for processing a data structure to identify dependent components, computer system and computer program product as described by the subject matter of the independent claims. Advantageous embodiments are described in the dependent claims. Embodiments of the present invention can be freely combined with each other if they are not mutually exclusive.

In one aspect, the invention relates to a computer implemented method for processing a data structure representing a dependency matrix (or a bipartite graph) having a plurality of columns representing respective first components and a plurality of rows representing respective second components. The method includes: assigning each cell of the matrix a value indicative of the level of dependency or indicative of an unknown dependency of a pair of first and second components forming the cell; assigning each component of the first and second components an affiliation vector $f_u$ and $f_i$, respectively, indicative of the strength of affiliation of the component to N predefined initial clusters of cells of the matrix, and initializing the affiliation vectors with predefined values; determining a probability model using the affiliations vectors $f_u$ and $f_i$ as parameters, wherein the probability model presents the probabilities for a first component of the first components to depend on or to be related to a second component of the second components; estimating the parameters of the probability model for a plurality of different numbers of clusters starting from the initial number N of clusters using the matrix (i.e. using the data structure); computing a score for the parameters of the probability model estimated for each of the plurality of different numbers of clusters; selecting the parameters of the probability model with the highest computed score; using the selected parameters of the probability model to identify cells of unknown dependencies pairs of first and second components that depend on each other.

In another aspect, the invention relates to a computer system for processing a data structure representing a dependency matrix having a plurality of columns representing respective first components and a plurality of rows representing respective second components. The computer system is configured for: assigning each cell of the matrix a value indicative of the level of dependency or indicative of an unknown dependency of a pair of first and second components forming the cell; assigning each component of the first and second components an affiliation vector $f_u$ and fi respectively indicative of the strength of affiliation of the component to N predefined initial clusters of cells of the matrix, and initializing the affiliation vectors with predefined values; determining a probability model using the affiliations vectors $f_u$ and $f_i$ as parameters, wherein the probability model presents the probabilities for a first component of the first components to depend on a second component of the second components; estimating the parameters of the probability model for a plurality of different numbers of clusters starting from the initial number N of clusters using the matrix; computing a score for the parameters of the probability model estimated for each of the plurality of different numbers of clusters; selecting the parameters of the probability model with the highest computed score; using the selected parameters of the probability model to identify cells of unknown dependencies pairs of first and second components that depend on each other.

In another aspect, the invention relates to a computer program product comprising a computer-readable storage medium having computer-readable program code embodied therewith, the computer-readable program code configured to implement all of steps of the method according to preceding embodiments.

BRIEF DESCRIPTION OF THE DRAWINGS

In the following embodiments of the invention are explained in greater detail, by way of example only, making reference to the drawings in which:

FIG. 3 illustrates a simplified example of the present method; and

DETAILED DESCRIPTION

Figure 1:
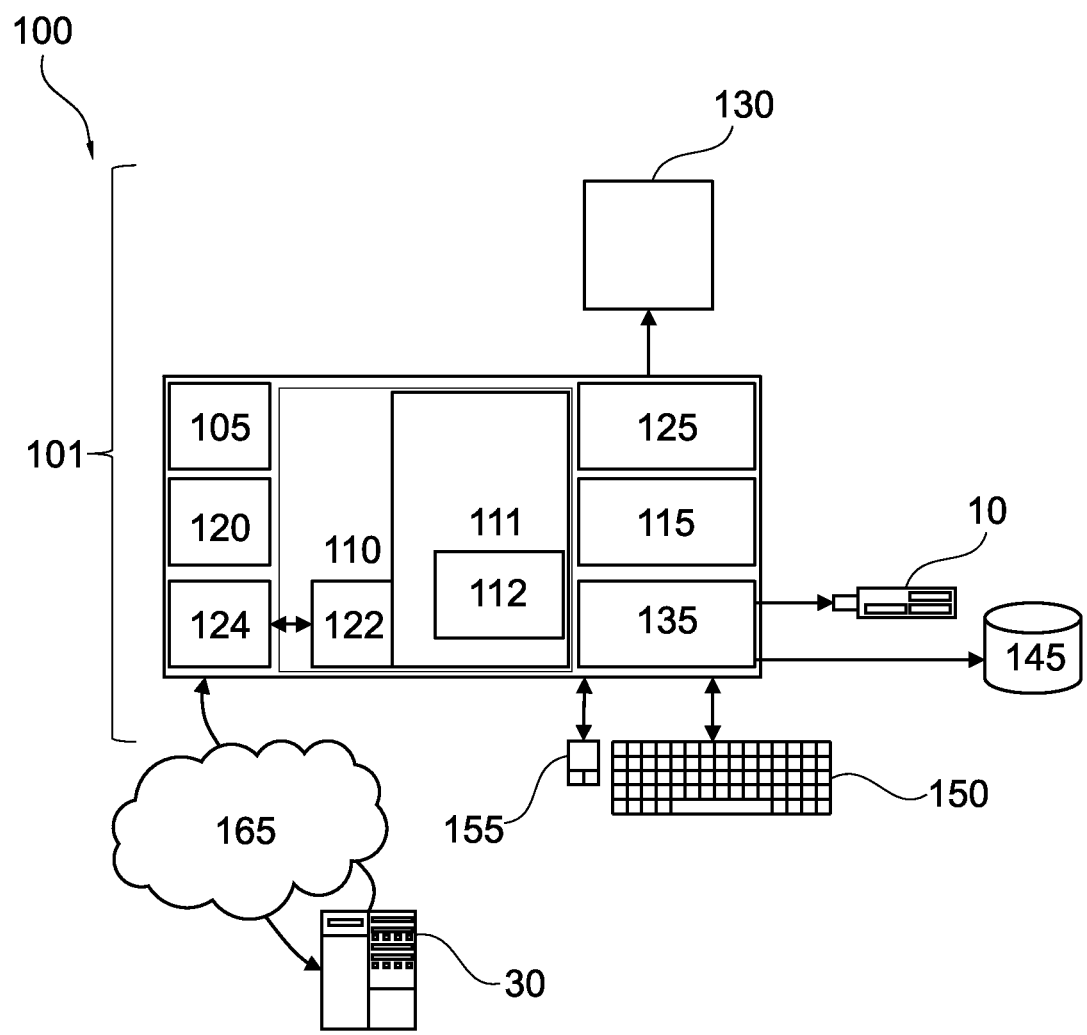
FIG. 1 represents a computerized system, suited for implementing one or more method steps as involved in the present disclosure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The first and second components are dependent (or related) components in case the first (second) component depends on the second (first) component and/or and the first and second components depend on each other. The term "dependent components" is used herein to refer to components that interact with or otherwise depend on each other for their functionality. In particular, a first component may rely upon the data and/or operations of a second component such that the first component may not operate properly without the second component's execution and/or data. For example, the first component may execute a function that utilizes input variables generated by the second component.

In another example, the first (second) component may have access or may use services provided by the second (first) component. When a first component requires data and/or operations and/or services from a second component, the first component is referred to as being dependent upon the second component.

The data structure may be used to model a technical system such as the Internet (e.g. each node represents a router and each edge represents a connection or dependencies between routers). The technical system may be a system or an assembly of the first and second components that are at least partially united in a form of interactions or dependencies to form an organized whole. For example, in computer field, the technical system may represent a logical connection of computers, peripherals, software, service routines, terminals and/or end-users which are organized to achieve a certain goal or to provide a given service or function.

For example, the first and second components may be part of a mobile telecommunication service provider system e.g. LTE system, where the first components comprise the base stations and the second components comprise mobile devices. In this example, a mobile device may depend on a base station if the mobile device had access to the cell that is serviced by the base station i.e. the mobile device has been serviced by the base station.

In another example, the allocation of (large) data chunks P vs. processor cores C (or simply "cores", for short), or more generally network nodes, etc. may be used, where the data chunk P may be the first component and the nodes may be the second components. Let us assume a bipartite graph of nodes C versus data P, where the existence of an edge indicates that a core has accessed the particular data P e.g. that core depends on data P. Data P could for instance be very large data chunks, distributed amongst a large set of nodes. Yet, the concept of component pairs used herein could be applied to various types of pairs of components e.g. cast into subjects vs. variables, parameters vs. parameter values, etc. The information recorded in the graph can also been conveyed in an adjacency matrix, updated in real-time, if necessary, and containing the value of 'one' at position [i, j] if there exists an edge between the nodes i and j, otherwise the value is 'zero'. Applications may notably extend to servers vs. clients, customers vs. products, etc.

At least part of the present method may be based on the intuition that there exist groups, clusters, or communities of users that are interested in a subset of the items (a user is interested in an item means that the user may have accessed or used a service of the item). Such clusters may be called co-clusters as they consist of both users and the items in which the users in the cluster are interested in. The terms "cluster" and "co-cluster" may be used interchangeably herein. As users can have several interests, and items might satisfy several needs, each user and item may belong to several co-clusters. Contrary, a co-cluster must contain at least one user and one item, and can therefore not consist of users only or items only.

The identified cells may be communicated to a user of the present method and a notification as part of a recommendation or notification message may be displayed or sent indicating the identified cells. A motivation for such recommendation that is based on finding user-item co-clusters including overlapping user-item co-clusters is that such an approach may offer an interpretable model: identification of sets of users that are interested in or may have access to a set of items, allows not only the inference of latent underlying patterns but can also lead to better and useful interpretable notifications.

A problem that may be addressed by at least part of the present method may be the following: assuming that a given a matrix R where the rows correspond to users and the columns correspond to items. If the (u,i)th element of R takes on the value $r_{ui}=1$ this indicates that user u had access to item i in the past (e.g. the user had used services provided by item i or the user u is dependent on item i). It is assumed that all values $r_{ui}$ that are not positive ($r_{ui}=1$) are unknown ($r_{ui}=0$) in the sense that user u might be interested in item i or not. The present method may identify items in which a user u is likely to be interested in. This may provide users with targeted item. Put differently, the positives may be found among the unknowns from positive examples only.

The present method may identify overlapping user-item co-clusters and generate notifications. The models' parameters are factors associated with users and items. Specifically, suppose there are N co-clusters (e.g. N can be determined from the data via cross validation). Cluster affiliation of user u and item i is modelled by the non-negative N-dimensional co-cluster affiliation vectors $f_u$ and $f_i$, respectively, where $[f_u]c=0$ signifies that user u does not belong to co-cluster c, and $[f_u]c>0$ is the affiliation strength of user u with co-cluster c.

Predicting or estimating dependencies for the cells of unknown dependencies may be advantageous as it may enable prior actions for controlling the function of the system of first and second components. Prior actions may have the advantage of saving system resources that would otherwise be required for a posterior action, namely, for detecting a dependent component after the dependency has occurred and for adapting the system accordingly. For example, in case of a network of first and second components, the prediction may be used in order to prevent an eventual network congestion by reserving in advance network resources for the pairs of first and second components of the identified cells.

In another example of social networks of users, the present method may enable reserving resources such as storage resources for the pairs of dependent users as these resources may be required by those users when initiating the connection or the dependency between them. Without doing that the system may run out of resources after the users have started their contact, which may cause system failures etc.

Another advantage may be that the present method may provide a secure access to the system of first and second components by preventing malicious access to the system. For example, the first components may comprise trusted and untested components. By identifying that some untrusted components may have access or may depend on other trusted components, those untrusted components may be prevented beforehand for performing such access.

According to one embodiment, the probability model is given by the following equation: $1-e^{-\langle f_u, f_i \rangle}$ where $\langle f, g \rangle = \Sigma_c [f]_c [g]_c$ denotes the inner product in $\mathbb{R}^N$ and c runs over each cluster of the N clusters. This embodiment may have the advantage of providing an accurate modelling of the dependency between components. This may prevent multiple attempts using different models in order to accurately identify the cells and may thus processing resources.

According to one embodiment, the parameters of the probability model are estimated by computing a maximum of a likelihood given by the following equation:

$$\mathcal{L} = \prod_{(u,i):r_{ui}=1} (1 - e^{-\langle f_u, f_i \rangle}) \prod_{(u,i):r_{u,i}=0} e^{-\langle f_u, f_i \rangle}$$

According to one embodiment, parameters of the probability model are estimated by computing a minimum of the following equation Q subject to $[f_u]_c, [f_i]_c \geq 0, \forall c_i$:

$$Q = -\log\mathcal{L} + \lambda \sum_i \|f_i\|_2^2 + \lambda \sum_u \|f_u\|_2^2,$$

$$\text{where } -\log\mathcal{L} = -\sum_{(u,i):r_{ui}=1} \log(1 - e^{-\langle f_u, f_i \rangle}) + \sum_{(u,i):r_{ui}=0} \langle f_u, f_i \rangle$$

and $\lambda \geq 0$ is a regularization parameter, where c runs over each cluster of the N clusters.

This embodiment may have the advantage of enabling a minimization separately on the parameters of the model, which may then speed up the minimization process compared to the case where the two parameters are learned together for the minimization of Q.

According to one embodiment, the minimizing comprises: determining the value of Q by adjusting values of the parameter $f_i$ while $f_u$ is fixed; determining the value of Q by adjusting values of the parameter $f_i$ while $f_u$ is fixed; selecting the parameters $f_i$ and $f_u$ after this process has been iteratively repeated one or more times; stopping this process when Q does not decrease sufficiently in this process e.g. Q decreases by a value that is smaller than or equal a maximum improvement value (threshold). The maximum improvement value may be equal to zero. In another example the maximum improvement value may be equal to some small number, e.g., 0.001. For example, Q may be equal to v0 in the current iteration and have value v1 in the following iteration. If |v1−v0| is smaller or equal to the maximum improvement value the iterations terminates. In another example, Q may have value v0 in the first determining step and value v1 in the second determining step, and if |v1−v0| is smaller or equal to the maximum improvement value the iterations terminates.

According to one embodiment, minimization of Q comprises using a gradient descent method for iteratively adjusting the parameters $f_u$ and $f_i$. In one example, a single gradient descent step may be used. Performing only one gradient descent step may significantly speed up the minimization algorithm. According to another embodiment, the data structure is a two-dimensional array of scalar elements, which captures dependencies between at least a predefined number of components. The predefined number of components may comprise $10^4$ components, preferably $10^5$ components. This may enable processing large data such as Big Data in a single process, which may then be efficient and fast.

According to one embodiment, the data structure is representable as an adjacency matrix of a bipartite graph, preferably a bipartite graph of components versus component attributes. According to another embodiment, the first and second components comprise nodes of a data communication network. By identifying the cells of pairs of dependent first and second components, eventual network congestion may be prevented by reserving in advance network resources for the pairs of components of the identified cells.

According to one embodiment, the probabilities for a first component of the first components to depend on a second component of the second components comprises the probability that at least one of: the first component accesses data in the second component; and the first component requests a service of the second component. According to one embodiment, the method further comprises notifying an operation state of the first and second components indicative of the identified cells. The notification may trigger an intervention in time in case of a security issues as described above.

According to one embodiment, identifying a cell comprises evaluating or calculating the probability model using the selected parameters for the pairs of first and second components of the cell and determining that the calculated probability model is higher than a predefined threshold e.g. 0.5. According to another embodiment, identifying affiliation of a first component (e.g., a user) or a second component (e.g., the item) with a given co-cluster comprises: determining that an entry of $f_u$ or $f_i$, respectively, that corresponds to the co-cluster is higher than a predetermined minimum strength threshold.

According to one embodiment, the identified cells being part of overlapping clusters. FIG. 1 represents a general computerized system, suited for implementing method steps as involved in the disclosure. It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions 112 for implementing method for identifying dependencies between components.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 140, 145 can be any generalized cryptographic card or smart card known in the art. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method.

Figure 2:
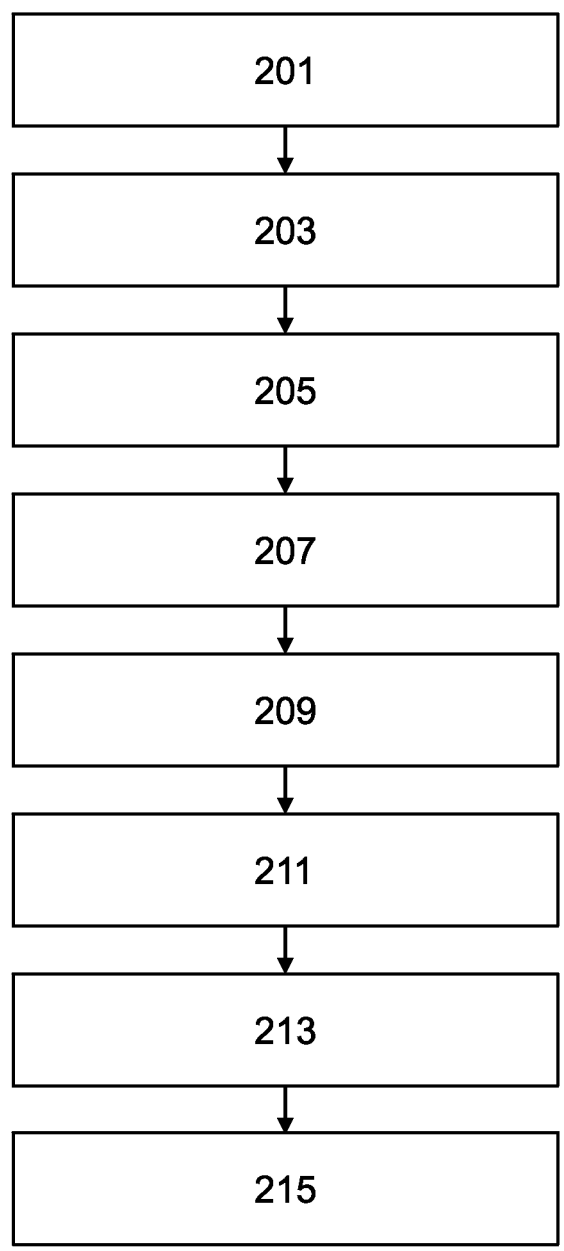
FIG. 2 is a flowchart of a method processing a data structure.

FIG. 2 is a flowchart of a method for processing a data structure. The term "data structure" as used herein refers to a scheme for organizing related pieces of information. For example, the data structure may comprise a two-dimensional array. The data structure may for example represent a dependency matrix (or a matrix) having a plurality of columns representing respective first components (or entities) and a plurality of rows representing respective second components (or entities).

A matrix may consist of a grid with cells. Each of the cells may be empty or may contain a scalar element. Scalar elements typically comprise numerical values, i.e., binary (0 or 1), real, complex numbers or strings, or more generally anything that can be converted to numbers for a sensible comparison. A value of a cell of the matrix may relate a first component u to a second component u, or more generally a pair of values (u,i) that indicates that u and i are connected or related to each other. For instance, dependencies between the first and second components may be represented in a binary form, with e.g., a value of 1 meaning that there is a dependency between two components, while 0 indicates no known dependency. More complex relations can however be captured by real values, where the actual value indicates e.g., an intensity or level of the dependency, a polarization of dynamic of the dependency (thanks to +/− sign), etc. More complex dependencies could still be captured thanks to complex numbers, a thing that incidentally would not prevent from calculating intra-block densities e.g., based on sum of absolute values of the scalar elements.

The term component or entity, as used herein, refers to hardware (e.g., a processor, a microprocessor, an ASIC, a FPGA, a chip, a memory device (e.g., a ROM, a RAM, etc.), etc.), software, data or a combination thereof (e.g., a processor, microprocessor, ASIC, etc. executing software contained in a memory device).

A first component of the first components depends on a second component of the second components if for example the second component has access to a service that is provided by the first component or vice versa. The first and second components may be components of a service provider system such as mobile telecommunication service provider system, where the first components may comprise base stations and the second components may comprise mobile telecommunication devices. The dependency between the first and second components may comprise for example that the second component has been previously serviced by the base station. The first components may, for example, comprise service providers such as application service providers that may provide services over a network for users or nodes. The second components may comprise the users or nodes of the network.

As shown at block 201, each cell of the matrix may be assigned a value indicative of the level or intensity of dependency or indicative of an unknown dependency of a pair of first and second components forming the cell. For example, a cell having value 0 may indicate that the pairs of the first and second components are not dependent. The assigned values may, for example, be obtained from or using history data describing previous operations of the first and second components. In another example, the assigned values may be received from one or more users of the first and second components. For example, block 201 may be performed on a periodic basis e.g. to take into account updates in the dependencies between the first and second components.

As shown at block 203, each component of the first and second components may be assigned a respective affiliation vector $f_u$ and $f_i$. The affiliation vectors $f_u$ and $f_i$ may indicate the strength of affiliation of the component to N predefined initial clusters of cells of the matrix. The N initial number of clusters may be randomly chosen. In another example, the N initial number of clusters may be user defined.

The affiliation vectors $f_u$ and $f_i$ may have a dimension N that corresponds to the number N of the initial clusters. For example, $f_u$ and $f_i$ may each comprise a data structure having N elements each associated with a respective cluster of the N initial clusters. For example, N clusters may be determined from data via cross validation. The N clusters may be smaller than the number items and smaller than number of users. Cluster affiliation of a second component u and first component i may be modelled by a non-negative N-dimensional cluster affiliation vectors $f_u$ and $f_i$, respectively, where $f_{u\_c}=0$ signifies that second component u does not belong to cluster c, and $f_{u\_c}>0$ is the affiliation strength of u with cluster c.

For example, the higher the number of second components that depend on a same first component in a given cluster the higher the strength of affiliation of that first component to the given cluster. The higher the number of the first components that depend on a same second component in a given cluster the higher the strength of affiliation of that second component to the given cluster. In other words, $f_u$ and $f_i$ may be latent factors which represent the degree of membership of a respective component to the N initial clusters.

As shown at block 205, the affiliation vectors $f_u$ and $f_i$ may be initialized with predefined values e.g. with values larger than zero or random values or any other values.

As shown at block 207, a probability model may be determined using the affiliations vectors $f_u$ and $f_i$ as parameters. The probability model presents the probabilities for a first component of the first components to depend on a second component of the second components.

In one example, if a second component u and first component i both lie in cluster c, then this cluster may generate a positive example with probability $1-e^{-[f_u]_c[f_i]_c}$, and assuming that each cluster c=1; ... ; N, generates a positive example independently, it follows that $$1 - P[r_{ui} = 1] = \prod_c e^{-[f_u]_c[f_i]_c} = e^{-\langle f_u, f_i \rangle}$$

where $\langle f,g \rangle = \Sigma_c[f]_c[g]_c$ denotes the inner product in $\mathbb{R}$. Thus the probability model may be determined as follows $$P[r_{ui}=1]=1-e^{-\langle f_u, f_i \rangle}$$

that represents the probability of u to depend on i.

Upon determining the probability model, the parameters $f_u$ and $f_i$ may be learned or fitted. This may for example be done as described in blocks 209-213. As shown at block 209, the parameters of the probability model may be estimated for a plurality of different numbers of clusters starting from the initial number N of clusters. As shown at block 211, a score may be computed for the parameters of the probability model estimated for each of the plurality of different numbers clusters. As shown at block 213, the parameters of the probability model with the highest computed score may be selected. The selected parameters $f_u$ and $f_i$ may or may not have the dimension of N. Further details on the parameters determination is described below. Further details of the parameters determination are described below.

As shown at block 215, the selected parameters of the probability model may be used to identify cells of unknown dependencies pairs of first and second components that depend on each other. For that, the values of the selected parameters may be used to evaluate the probability model for each pair of first and second components of the matrix. For example, a cell that has assigned value 0 at the beginning in block 201 may be identified if the probability that the first component depends on the second component of that cell is higher than a given threshold. This threshold may for example be equal to 0, 0.5 or 0.7.

FIG. 3 illustrates a simplified example of the present method. Suppose M items need to be determined that are dependent with each user, where item i may comprise a server and a user may comprise a client of a client-server configuration. After having fitted the model parameters $f_u$ and $f_i$, it may be determined that item i is dependent of user u if $r_{ui}$ is among the M largest values P $[r_{ui'}=1]$, where i' is over all items that user u did not depend on, i.e., over all i' with $r_{ui'}=0$. The probability P $[r_{ui}=1]$ is large if the user-item pair (u, i) is in one or more user-item co-clusters. Thus, along with a notification, it can be output the corresponding user-item co-clusters that cause P $[r_{ui}=1]$ or, equivalently, $\langle f_u,f_i \rangle = \Sigma_c[f_u]_c[f_i]_c$ to be large. The user-item co-cluster c is determined as the subset of users and items for which $[f_u]_c$ and $[f_i]_c$, respectively, are large.

Consider checking dependency of a single item to user 6 (users 0-11 and items 0-11 correspond to the rows and columns of the matrix in 301). The probabilities of the fitted model for each user-item pair are depicted in FIG. 3. The probability estimate P $[r_{ui}]=1-e^{-\langle f_u, f_i \rangle}$, u=6 is maximized among the unknown examples $r_{ui}=0$ for item i=4, and is given by 0.83. Therefore, item i=4 may be candidate item that may depend with user u=6. The corresponding factors are fi=[1.39, 0.73, 0.82] and fu=[0, 1.05, 1.25], which means that item i=4 is in all three co-clusters 303-307, while user u=6 is in co-cluster 305 and 307 only. The probability estimate $1-e^{-\langle f_u, f_i \rangle}$ for u=6, i=4 is large because both user 6 and item 4 are in the co-clusters 305 and 307.

FIG. 3 further shows an example content 309 of the notification of the results of identifying user 6 and item 4. The content may for example be displayed on display 130. The content is so structured to enable a proper intervention in the system based on identified dependencies.

Given a matrix R, the parameters of the probability model may be fitted by finding the most likely factors $f_u$, $f_i$ to the matrix R by maximizing the likelihood (it is assumed that positive examples are generated independently across co-clusters 303-307 and across items and users in co-clusters):

$$\mathcal{L} = \prod_{(u,i):r_{ui}=1} (1 - e^{-\langle f_u, f_i \rangle}) \prod_{(u,i):r_{ui}=0} e^{-\langle f_u, f_i \rangle}$$

Maximizing the likelihood is equivalent to minimizing the negative log-likelihood:

$$-\log\mathcal{L} = -\sum_{(u,i):r_{ui}=1} \log(1 - e^{-\langle f_u, f_i \rangle}) + \sum_{(u,i):r_{ui}=0} \langle f_u, f_i \rangle$$

To prevent overfitting, an $l_2$ penalty may be added, which results in the following optimization problem:
minimize Q subject to $[f_u]_c, [f_i]_c \geq 0$, $\forall c$, where $$Q = -\log\mathcal{L} + \lambda \sum_i \|f_i\|_2^2 + \lambda \sum_u \|f_u\|_2^2$$

and $\lambda \geq 0$ is a regularization parameter.

In order to do the optimization, one might iterate between fixing the $f_u$, and minimizing with respect to the $f_i$, and fixing the $f_i$ and minimizing with respect to the $f_u$, until convergence. This method may comprise a cyclic block coordinate descent or the non-linear Gauss-Seidel method. Whereas Q is non-convex in the $f_i$, $f_u$, Q is convex in the fi (with the $f_u$ fixed) and convex in the $f_u$ (with the $f_i$ fixed). Therefore, a solution to the subproblems of minimizing Q with fixed $f_i$ and minimizing Q with fixed $f_u$ can be found, e.g., via gradient descent or Newton's method. A convergence to a stationary point may be ensured. Specifically, provided that $\lambda > 0$, Q may be strongly convex in the $f_i$ (with the $f_u$ fixed) and in the $f_u$ (with the $f_i$ fixed). Thus, the subproblems have unique solutions and therefore, if each subproblem is solved exactly, convergence to a stationary point is ensured.

However, solving the subproblems exactly may slow down convergence, because when the $f_u$, $f_i$, are far from a stationary point, it indicates that there is little reason to allocate computational resources to solve the subproblems exactly. It may therefore be often more efficient to solve the subproblem only approximately in each iteration. Therefore, a projected gradient descent with backtracking line search may be used and only one single descent step, to solve the subproblems approximately, and iteratively update the $f_i$ and the $f_u$ via single gradient descent steps until convergence (see implementation details below). Convergence is declared if Q stops decreasing. This results in a very efficient algorithm that is essentially linear in the number of positive examples $\{(u, i):r_{ui}=1\}$, and the number of co-clusters N. Simulations have shown that performing only one gradient descent step will significantly speeds up the algorithms.

The projected gradient descent approach that is used to solve the subproblems and the complexity of the overall optimization algorithm will now be described. It is sufficient to discuss minimization of Q with respect to the $f_i$, as minimization with respect to the $f_u$ is equivalent. Noting that, because of $$Q = \sum_i \left( -\sum_{u:r_{ui}=1} \log(1 - e^{-\langle f_u, f_i \rangle}) + \sum_{u:r_{ui}=1} \langle f_u, f_i \rangle \right) + \lambda \sum_u \|f_u\|_2^2 + \lambda \sum_i \|f_i\|_2^2,$$

we can minimize Q for each fi individually. The part of Q depending on fi is given by $$Q(f_i) = -\sum_{u:r_{ui}=1} \log(1 - e^{-\langle f_u, f_i \rangle}) + \left\langle f_i, \sum_{u:r_{ui}=0} f_u \right\rangle + \lambda \|f_i\|_2^2$$

As mentioned above, the parameter fi may be updated by performing a projected gradient descent step. The projected gradient descent algorithm is initialized with a feasible initial factor f0 and updates the current solution $f_i^k$ to $f_i^{k+1}$ according to $$f_i^{k+1} = (f_i^k - \alpha_k \nabla Q(f_i^k))_+$$

where $(f)_+$ projects f on its positive part, $[(f)_+]c=\max(0; [f]c)$, and the gradient is given by $$\nabla Q(f_i) = -\sum_{u:r_{ui}=1} f_u \frac{e^{-\langle f_u, f_i \rangle}}{1 - e^{-\langle f_u, f_i \rangle}} + \sum_{u:r_{ui}=0} f_u + 2\lambda f_i$$

The step size k is selected using a backtracking line search, also referred to as the Armijo rule, along the projection arc. Specifically, $\alpha_k = \beta^{t_k}$, where $t_k$ is the smallest positive integer such that $$Q(f_i^{k+1}) - Q(f_i^k) \leq \sigma \langle \nabla Q(f_i^k), f_i^{k+1} - f_i^k \rangle$$

where $\sigma, \beta \in (0, 1)$ are constants. As the computation of both $\nabla Q(f_i)$ and $Q(f_i)$ requires $\sum_{u:r_{ui}=0} f_u$, and typically the number of items for which $r_{ui}=1$ is small relative to the total number of items, we precompute $\sum_u f_u$ before updating all fi, and then compute $\sum_{u:r_{ui}=0} f_u$ via $$\sum_{u:r_{ui}=0} f_u = \sum_u f_u - \sum_{u:r_{ui}=1} f_u$$

Using the precomputed $\sum_{u:r_{ui}=0} f_u$, a gradient descent step of updating fi has cost $O(|\{u:r_{ui}=1\}|N)$. Thus, updating all $f_i$ and all $f_u$ has cost $O(|\{(i,u):r_{ui}=1\}|N)$, which means that updating all factors has cost linear in the problem size (i.e., number of positive examples) and linear in the number of co-clusters.

Figure 4:
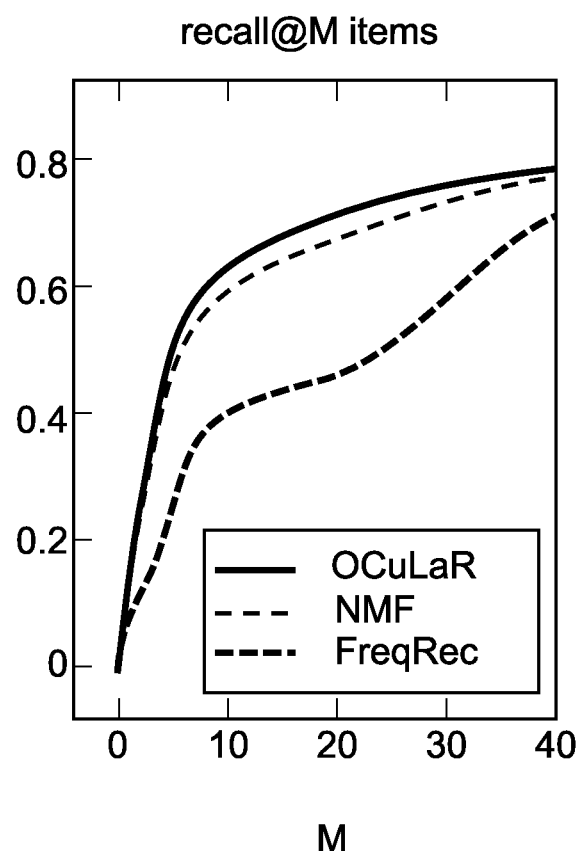
FIG. 4 shows the performance results of an exemplary method of the present disclosure.

FIG. 4 shows the results of the evaluation of at least part of the present method referred to as or named OCuLaR algorithm. The OCuLaR algorithm has been evaluated and its performance has been compared to baseline algorithms in terms of mean average precision at M (MAP@M) items and the recall at M items, two standard performance measures for the problem at hand. A dataset has been used which consists of all European users and a few hundred of items such as servers. Performance was evaluated by splitting the data into a training and test set with a splitting ratio of training/test=75/25.

The performance may be measured in recall at M items. Because an example $r_{ui}$ not being positive does not mean that u is not interested in item i, an accurate comparison of the precision may require improvement. However, recall is a sensible performance criterion. For a given user, the recall@M items is defined as $$\text{recall@M} = \frac{|\{i : r_{ui} = 1\} \cap \{i_1, \ldots, i_M\}|}{NU},$$

where NU is the number of items that the user has used or accessed.

FIG. 4 shows the comparison of the OCuLaR algorithm (N=30 number of co-clusters) with regularization to the OCuLaR algorithm and to two baselines: non-negative matrix factorization (NMF) used for fitting at least part of the probability model, $<f_u, f_i>$, and FreqRec, an algorithm that recommends the most popular items. The OCuLaR algorithm performs better than the two algorithms.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer implemented method for processing a data structure representing a dependency matrix having a plurality of columns representing respective first components and a plurality of rows representing respective second components, the method comprising:
   assigning each cell of the matrix a value indicative of the level of dependency or indicative of an unknown dependency of a pair of first and second components forming the cell;
   assigning each component of the first and second components an affiliation vector $f_u$ and $f_i$ respectively indicative of the strength of affiliation of the component to N predefined initial clusters of cells of the matrix, and initializing the affiliation vectors with predefined values;
   determining a probability model using the affiliations vectors $f_u$ and $f_i$ as parameters, wherein the probability model presents the probabilities for a first component of the first components to depend on a second component of the second components;
   estimating the parameters of the probability model for a plurality of different numbers of clusters starting from the initial number N of clusters using the matrix;
   computing a score for the parameters of the probability model estimated for each of the plurality of different numbers of clusters;
   selecting the parameters of the probability model with the highest computed score;
   using the selected parameters of the probability model to identify cells of unknown dependencies pairs of first and second components that depend on each other.

2. A computer system for processing a data structure representing a dependency matrix having a plurality of columns representing respective first components and a plurality of rows representing respective second components, the computer system being configure for:
   assigning each cell of the matrix a value indicative of the level of dependency or indicative of an unknown dependency of a pair of first and second components forming the cell;
   assigning each component of the first and second components an affiliation vector $f_u$ and $f_i$ respectively indicative of the strength of affiliation of the component to N predefined initial clusters of cells of the matrix, and initializing the affiliation vectors with predefined values;
   determining a probability model using the affiliations vectors $f_u$ and $f_i$ as parameters, wherein the probability model presents the probabilities for a first component of the first components to depend on a second component of the second components;
   estimating the parameters of the probability model for a plurality of different numbers of clusters starting from the initial number N of clusters using the matrix;
   computing a score for the parameters of the probability model estimated for each of the plurality of different numbers of clusters;
   selecting the parameters of the probability model with the highest computed score;
   using the selected parameters of the probability model to identify cells of unknown dependencies pairs of first and second components that depend on each other.

3. A computer program product comprising a computer-readable storage medium having computer-readable program code embodied therewith, the computer-readable program code configured to implement a method comprising:
   assigning each cell of the matrix a value indicative of the level of dependency or indicative of an unknown dependency of a pair of first and second components forming the cell;
   assigning each component of the first and second components an affiliation vector $f_u$ and $f_i$ respectively indicative of the strength of affiliation of the component to N predefined initial clusters of cells of the matrix, and initializing the affiliation vectors with predefined values;
   determining a probability model using the affiliations vectors $f_u$ and $f_i$ as parameters, wherein the probability model presents the probabilities for a first component of the first components to depend on a second component of the second components;
   estimating the parameters of the probability model for a plurality of different numbers of clusters starting from the initial number N of clusters using the matrix;
   computing a score for the parameters of the probability model estimated for each of the plurality of different numbers of clusters;
   selecting the parameters of the probability model with the highest computed score;
   using the selected parameters of the probability model to identify cells of unknown dependencies pairs of first and second components that depend on each other.

4. The computer program product of claim 3, wherein the probability model is a function of the inner product $<f_u, f_i>$ between two affiliation vectors $f_u$ and $f_i$ in $R^N$ corresponding to the first and second components, where c runs over each cluster of the N clusters.

5. The computer program product of claim 3, wherein the probability model is given by the following equation: $1-e^{-\langle f_u, f_i \rangle}$.

6. The computer program product of claim 3, wherein the data structure is representable as an adjacency matrix of a bipartite graph, preferably a bipartite graph of components versus component attributes.

7. The computer program product of claim 6, wherein the probabilities for a first component of the first components to depend on a second component of the second components comprises the probability that at least one of:
   the first component accesses data in the second component;
   the first component requests a service of the second component.

* * * * *